(12) United States Patent  
Chino

(10) Patent No.: US 7,728,856 B2  
(45) Date of Patent: Jun. 1, 2010

(54) LIGHT AMOUNT CORRECTING METHOD FOR LIGHT EMITTING APPARATUS, IMAGE FORMING APPARATUS, AND DISPLAY APPARATUS

(75) Inventor: Taketo Chino, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 803 days.

(21) Appl. No.: 11/461,169

(22) Filed: Jul. 31, 2006

(65) Prior Publication Data

US 2007/0030327 A1 Feb. 8, 2007

(30) Foreign Application Priority Data

Aug. 8, 2005 (JP) ............................. 2005-229141

(51) Int. Cl.
*B41J 2/385* (2006.01)
*B41J 2/435* (2006.01)

(52) U.S. Cl. ........................ 347/135; 347/236; 347/237; 347/246; 347/247

(58) Field of Classification Search ................ 347/135, 347/253, 236, 237, 257, 246, 247  
See application file for complete search history.

(56) References Cited

U.S. PATENT DOCUMENTS

| | | | | |
|---|---|---|---|---|
| 4,896,222 A | * | 1/1990 | Fukai | 358/446 |
| 2002/0008760 A1 | * | 1/2002 | Nakamura | 348/222 |
| 2002/0051052 A1 | * | 5/2002 | Masuda et al. | 347/236 |
| 2004/0189729 A1 | * | 9/2004 | Nakahanada et al. | 347/14 |
| 2005/0012821 A1 | * | 1/2005 | Kanai | 348/189 |
| 2005/0111016 A1 | * | 5/2005 | Yoneyama et al. | 358/1.9 |

FOREIGN PATENT DOCUMENTS

| | | | | |
|---|---|---|---|---|
| JP | A 59-194566 | | | 11/1984 |
| JP | A 60-107373 | | | 6/1985 |
| JP | A 62-246753 | | | 10/1987 |
| JP | 2006256150 A | * | | 9/2006 |
| JP | 2007044898 A | * | | 2/2007 |

* cited by examiner

*Primary Examiner*—Stephen D Meier  
*Assistant Examiner*—Sarah Al-Hashimi  
(74) *Attorney, Agent, or Firm*—Oliff & Berridge, PLC

(57) ABSTRACT

A light amount correcting method for a light emitting apparatus having a plurality of light emitting devices, includes: measuring light amount values of a plurality of the light emitting devices; extracting high frequency components from the measured light amount values; extracting low frequency components from the measured light amount values; calculating a first correction value for correcting a light amount value of a first light emitting device on the basis of the high frequency components; and correcting a second correction value for correcting the light amount value of the first light emitting device on the basis of the low frequency components; and correcting a light amount value of a second light emitting device such that it is included in both of the first allowable range and the second allowable range.

17 Claims, 10 Drawing Sheets

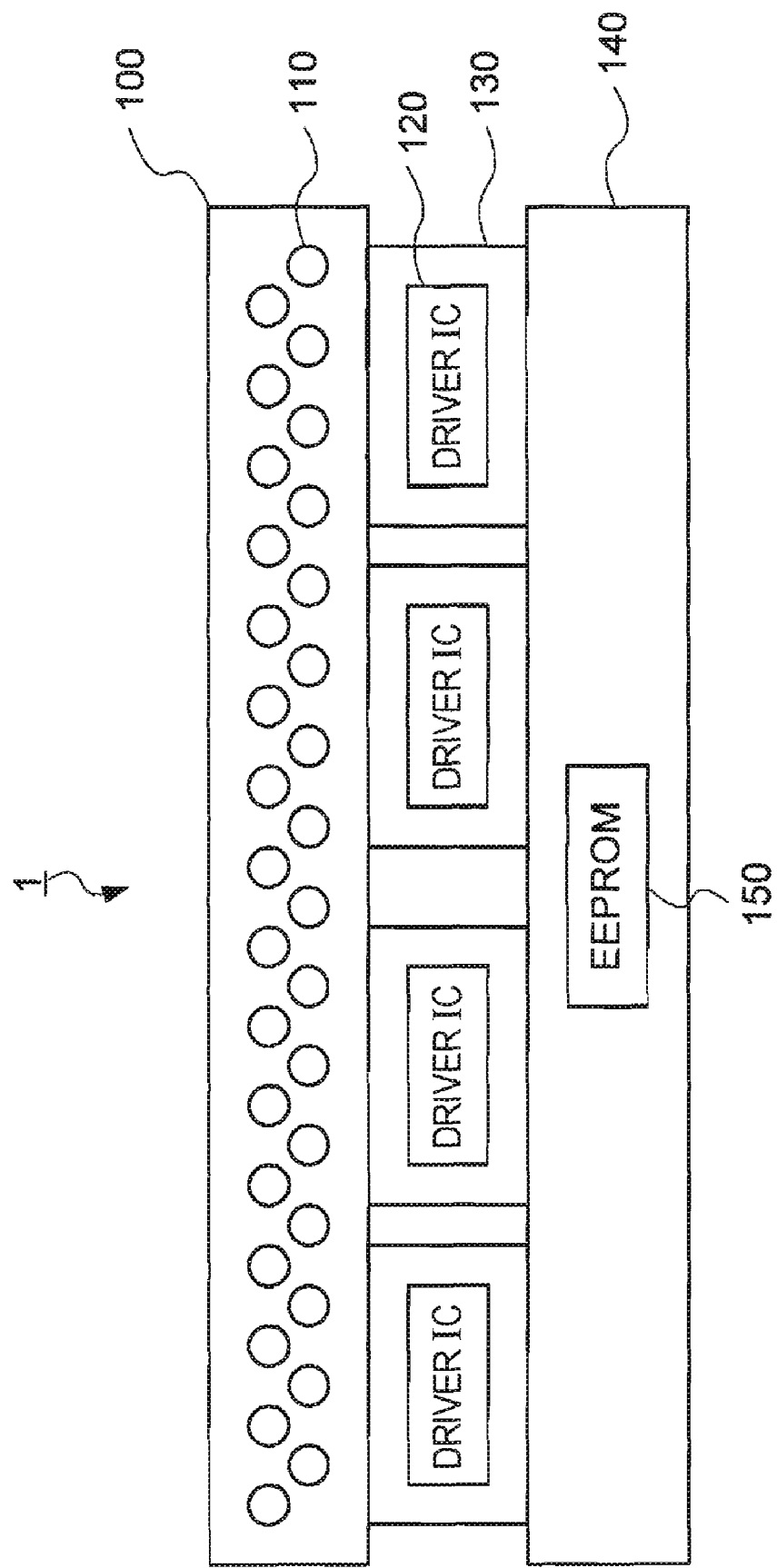

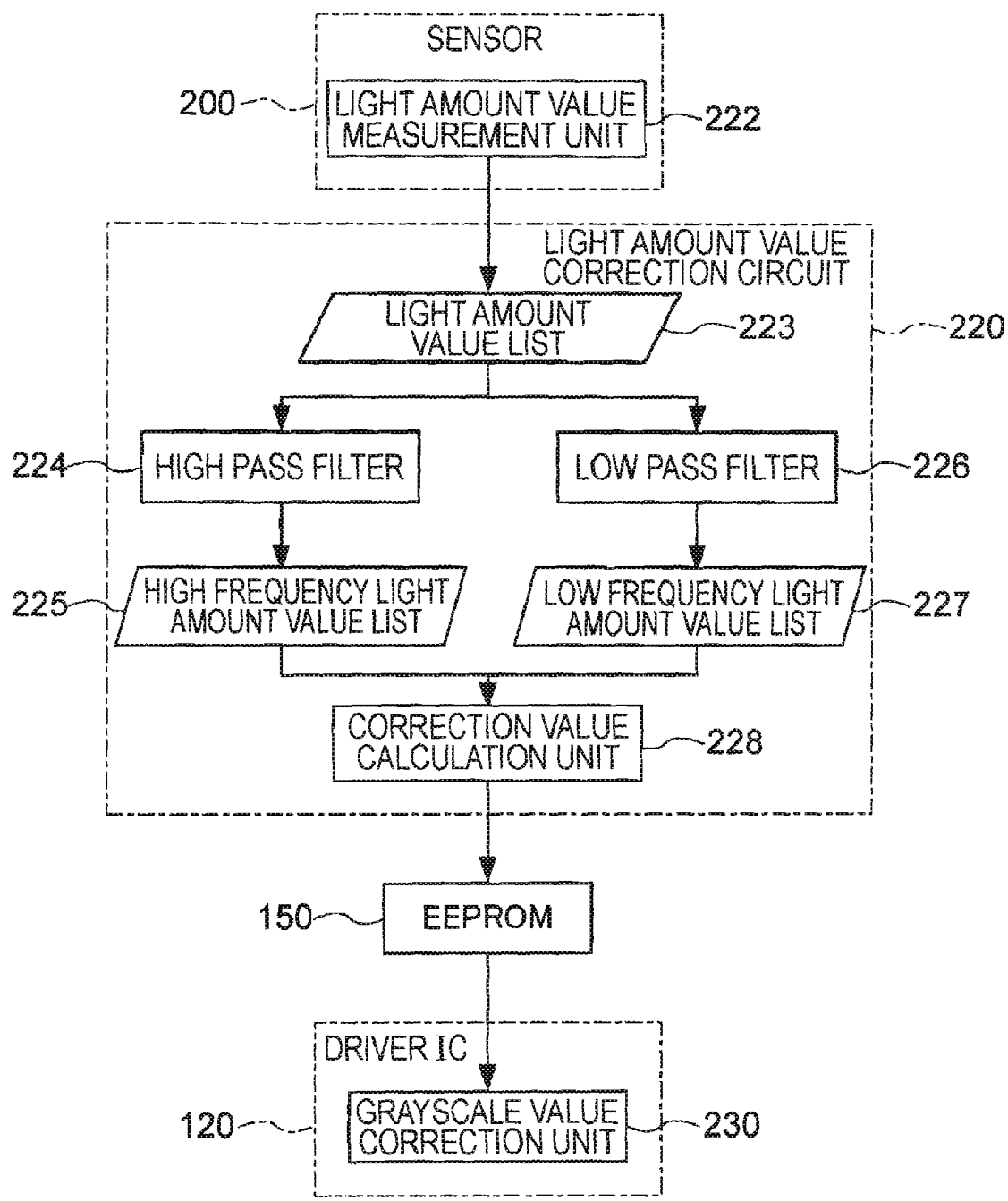

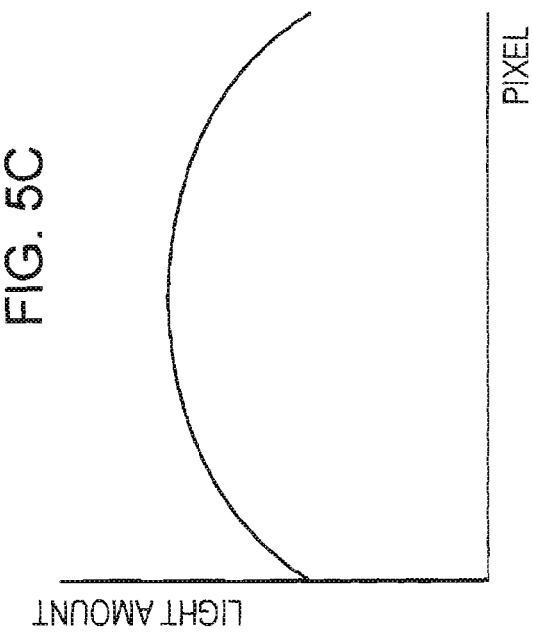
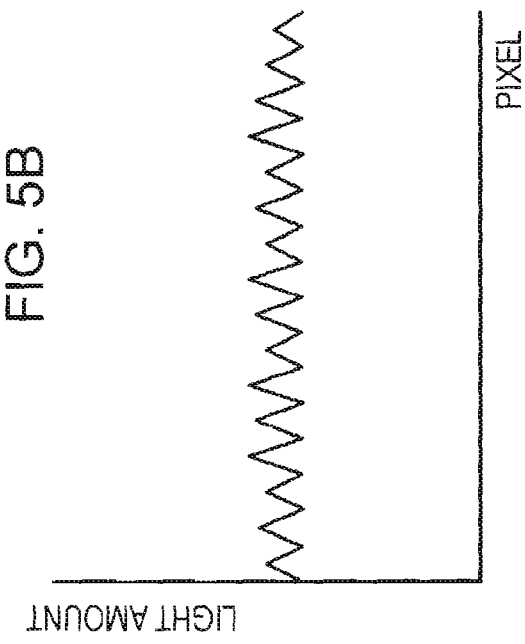
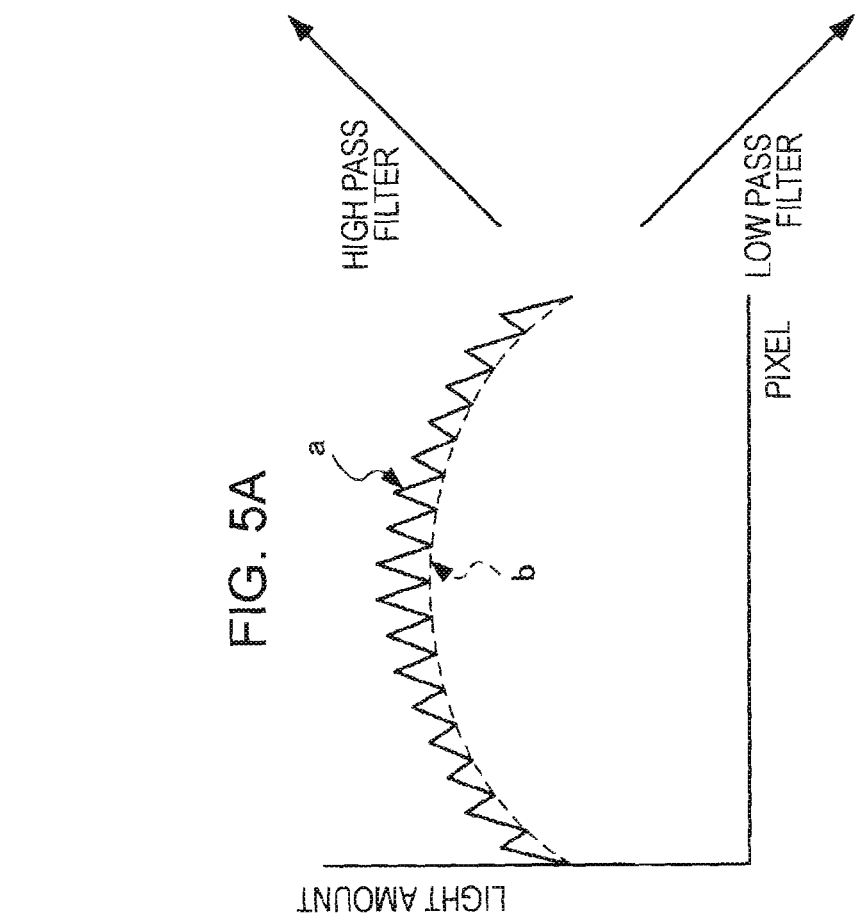

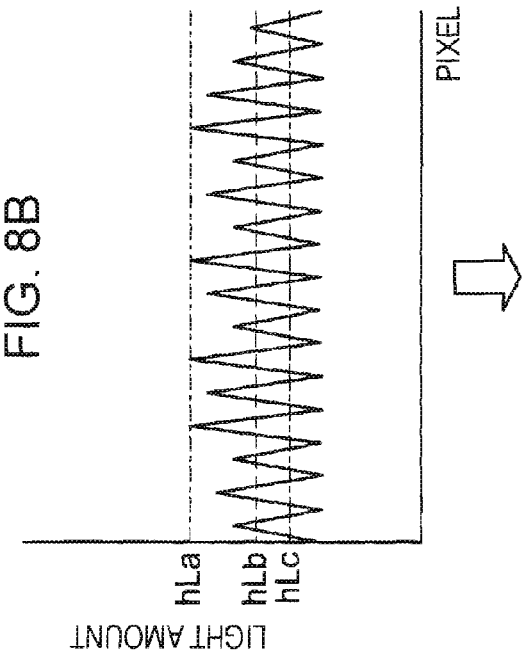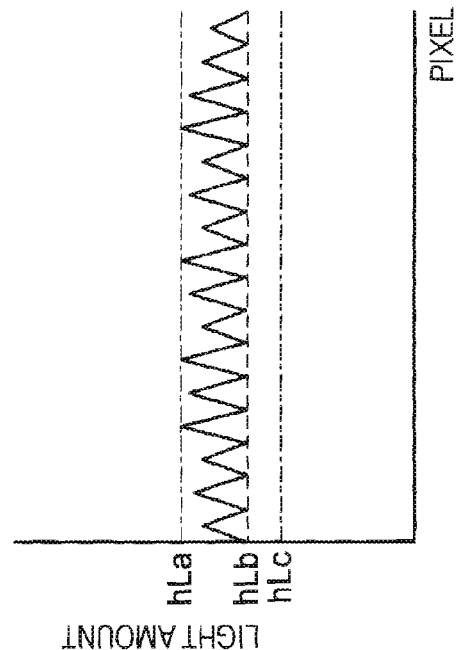
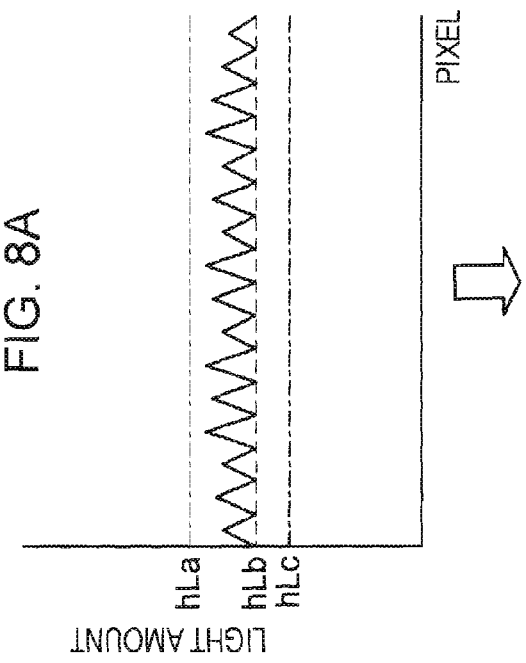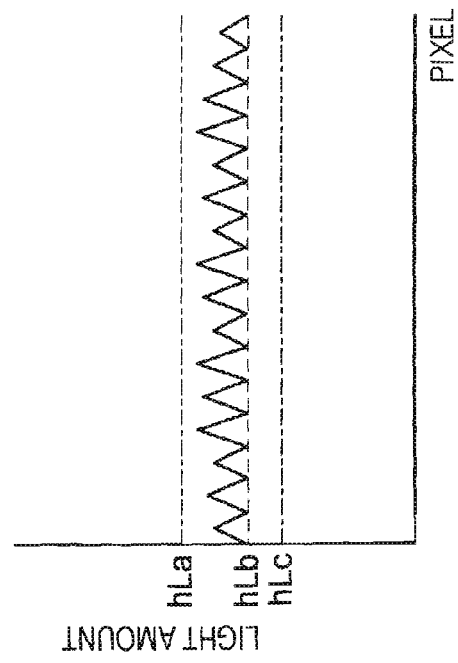

LIGHT AMOUNT CORRECTING METHOD FOR LIGHT EMITTING APPARATUS, IMAGE FORMING APPARATUS, AND DISPLAY APPARATUS

BACKGROUND

1. Technical Field

The present invention relates to a light amount correcting method for a light emitting apparatus, an image forming apparatus, and a display apparatus

2. Related Art

An image forming apparatus such as a copier using line heads constructed by arraying a plurality of light emitting devices in a line as exposure units has been developed. With respect to the image forming apparatus, there has been proposed a technique for suppressing occurrence of a change in brightness caused from deterioration in characteristics of the light emitting devices or a variation of brightness caused from deterioration of lightening over the entire heads.

In order to solve the problem, a technique for measuring a variation in light amount and adjusting voltages, current, and light emitting time for pixels so as for the light amounts to be uniform is disclosed in, for example, JP-A-59-194566. On the other hand, a technique for detecting light amounts with optical sensors and correcting the light amounts based on the detected light amount values is disclosed in, for example, JP-A-60-107373. In addition, a technique for counting light emitting times for the pixels with a counter and correcting the light amount based on the counted light emitting times is disclosed in JP-A-62-246753.

However, in tone technique disclosed in JP-A-59-94566, the light amount correction value for a pixel having a small light amount greatly increases so as for the light amount to be uniform in comparison with a pixel having a large light amount. Therefore, the deterioration of the pixel becomes as large as the correction value. In addition, since a large number of bits of the correction value are required so as for the light amount to be uniform, a size of a circuit becomes large. On the other hand, in the technique disclosed in JP-A-60-107373, since the light sensor is provided to each of the pixels, production cost increases. In the technique disclosed in JP-A-62-246753, since the counter is provided to each of the pixels, production cost also increases.

SUMMARY

The invention is to provide a correcting method for a light emitting apparatus and an image forming apparatus capable of maintaining printing quality, reducing production cost, and suppressing deterioration of devices.

According to an aspect of the invention, there is provided a light amount correcting method for a light emitting apparatus having a plurality of light emitting devices driven according to grayscale value of input data, comprising: measuring light amount values of a plurality of the light emitting devices when emitting light with predetermined grayscale values to generate a light amount value list; extracting high frequency components from the light amount value list by filtering the light amount value list with a high pass filter using a predetermined cutoff frequency to generate a high frequency light amount value list; extracting low frequency components from the light amount value list by filtering the light amount value list with a low pass filter using a predetermined cutoff frequency to generate a low frequency light amount value list; calculating first correction values for correcting the light amount values in the high frequency light amount value list to be included in a predetermined first allowable range and second correction value for correcting the light amount values in the low frequency light amount value list to be included in a predetermined second allowable range and calculating correction values for a plurality of the light emitting devices based on the first and second correction values; and correcting grayscale values of the input data for a plurality of the light emitting devices based on the correction values.

According to the construction, variations of the light emitting values between the light emitting devices are divided into a high frequency component representing a variation between adjacent light emitting devices and a low frequency component representing a tendency of a variation of the light emitting device of the whole light emitting apparatus, and the correction values for the light emitting devices are calculated, so that the correction can be performed by taking into consideration characteristics of the light emitting devices. As a result, a deterioration of the light emitting devices can be suppressed, so that it is possible to maintain printing quality.

In the correcting method for the light emitting apparatus, the second allowable range may be wider than the first allowable range.

According to the construction, since a range of the low frequency component representing a tendency of a variation of the light emitting device of the whole light emitting apparatus is wider than that of the a high frequency component representing a variation between adjacent light emitting devices, it is possible to obtain a suitable correction value by widening the allowable range of the low frequency component.

In the correcting method for the light emitting apparatus, when all the light amount values in the high frequency light amount value list are included in the first allowable range and when all the light amount values in the low frequency light amount value list are included in the second allowable range and, the grayscale values of the input data for a plurality of the light emitting devices may not be corrected.

According to the construction, since unnecessary correction may not be performed, a deterioration of the light emitting devices can be suppressed, so that it is possible to maintain printing quality.

In the correcting method for the light emitting apparatus, lower limits of the first and second allowable ranges may be set to a value which is higher by a value corresponding to deterioration in the light amount values caused from an elapsing time of the light emitting devices.

According to the construction, the lower limit of the light amount values of the light emitting devices are set to be higher by the deterioration value than the lower limit of the allowable range by taking into consideration the deterioration value occurring as time elapses, so that it is possible to maintain printing quality of the light emitting devices for a long time.

In the correcting method for the light emitting apparatus, the correcting of the grayscale values may be performed by correcting the grayscale values based on a voltage.

According to the construction, in case of current-driven type light emitting devices, a deterioration of the light emitting devices can be suppressed, so that it is possible to maintain printing quality.

In the correcting method for the light emitting apparatus, the correcting of the grayscale values may be performed by correcting the grayscale values based on a current.

According to the construction, in case of current-driven type light emitting devices, a deterioration of the light emitting devices can be suppressed, so that it is possible to maintain printing quality.

In the correcting method for the light emitting apparatus, the correcting of the grayscale values may be performed by correcting the grayscale values based on a light-emitting time.

According to the construction, in case of pulse width modulation type light emitting devices, a deterioration of the light emitting devices can be suppressed, so that it is possible to maintain printing quality.

In the correcting method for the light emitting apparatus, the correction values may be calculated with respect to the corresponding grayscale values.

According to the construction, since the correction value is set for each of the grayscale values, a variation of the light amount values depending on the grayscale values can be treated. As a result, a deterioration of the light emitting devices can be suppressed, so that it is possible to maintain printing quality.

In the correcting method for the light emitting apparatus, the calculating of the correction values may be performed to set the correction values so as for light amount values of the light emitting devices at both ends of the light emitting apparatus to be equal to each other.

According to the construction, when a paper is printed with a uniform color by the light emitting apparatus, colors at the both side of the paper become equal to each other, so that there is no discomfort between the transversely aligned colors.

According to another aspect of the invention, there is provided a light emitting apparatus, wherein the light amount values of a plurality of the light emitting devices are corrected by using the aforementioned correcting method for the light emitting apparatus.

According to the construction, variations of the light emitting values between the light emitting devices are divided into a high frequency component representing a variation between adjacent light emitting devices and a low frequency component representing a tendency of a variation of the light emitting device of the whole light emitting apparatus, and the correction values for the light emitting devices are calculated, so that the correction can be performed by taking into consideration characteristics of the light emitting devices. As a result, a deterioration of the light emitting devices can be suppressed, so that it is possible to maintain printing quality.

In the light emitting apparatus, a plurality of the light emitting devices may be organic light emitting diode devices.

According to the construction, it is possible to correct a variation of brightness of a plurality of the organic light-emitting diode device accurately with such a simple construction.

In the light emitting apparatus, a plurality of the light emitting devices may be arrayed in a shape of one line.

According to the construction, in case of a light emitting apparatus constructed by arraying a plurality of the light emitting devices, that is, line heads in a line, it is possible to correct a variation of brightness of the light emitting devices accurately with such a simple construction.

In the light emitting apparatus, a plurality of the light emitting devices may be two-dimensionally arrayed.

According to the construction, in case of a light emitting apparatus constructed by two-dimensionally arraying a plurality of light emitting in a line, that is, a display panel, it is possible to correct a variation of brightness of the light emitting devices accurately with such a simple construction.

According to still another aspect of the invention, there is provided an image forming apparatus comprising: a photosensitive body; a charging unit which uniformly charges the photosensitive body; an exposure unit which includes the light emitting apparatus according to claim 12 and exposes the photosensitive body to form an electro-static latent image corresponding to to-be-formed image on the photosensitive body; a developing unit which develops the electro-static latent image on the photosensitive body as a toner image; a transferring unit which transfers the toner image on the photosensitive body onto a transfer material; and a fixing unit which fixes the toner image on the transfer material.

According to the construction, variations of the light emitting values between the light emitting devices are divided into a high frequency component representing a variation between adjacent light emitting devices and a low frequency component representing a tendency of a variation of the light emitting device of the whole light emitting apparatus, and the correction values for the light emitting devices are calculated, so that the correction can be performed by taking into consideration characteristics of the light emitting devices. Therefore, a deterioration of the light emitting devices can be suppressed, so that it is possible to maintain printing quality. As a result, it is possible to improve image quality of a formed image.

According to further still another aspect of the invention, there is provided a display apparatus including the aforementioned light emitting apparatus and displaying an image by using the light emitting devices of the light emitting apparatus as pixels.

According to the construction, it is possible to correction a variation of brightness caused from deterioration in characteristics of the light emitting devices accurately with such a simple construction. As a result, it is possible to improve image quality of a formed image.

BRIEF DESCRIPTION OF THE DRAWINGS

The invention will be described with reference to the accompanying drawings, wherein like numbers reference like elements.

FIG. 1 is a schematic constructional view showing a light emitting apparatus according to an embodiment of the invention.

FIG. 4 is a constructional view showing a light amount value correction circuit.

FIGS. 5A to 5C are graphs showing a method of dividing a light amount value list into high and low frequency components.

FIGS. 8A and 8B are graphs for explaining correction of a high frequency component of a light amount value.

DESCRIPTION OF EXEMPLARY EMBODIMENTS

Hereinafter, embodiments of the invention will be described with reference to the accompanying drawings.

First Embodiment

Construction of Light Emitting Apparatus

FIG. 1 is a schematic constructional view a light emitting apparatus used as a printer line head according to an embodiment of the invention. As shown in FIG. 1, the light emitting apparatus 1 includes a device substrate 100 and a PCB (Print Circuit Board) 140 which are connected to each other with a FPC (Flexible Printed Circuit) 130, that is, a flexible printed circuit board. A plurality of light emitting devices 110 are disposed on the device substrate 100. Driver ICs 120 which drive light emitting devices are disposed on the FPC 130. EEPROM (Electronically Erasable and Programmable Read Only Memory) 150 which stores correction values is disposed on the PCB 140.

Figure 2A:
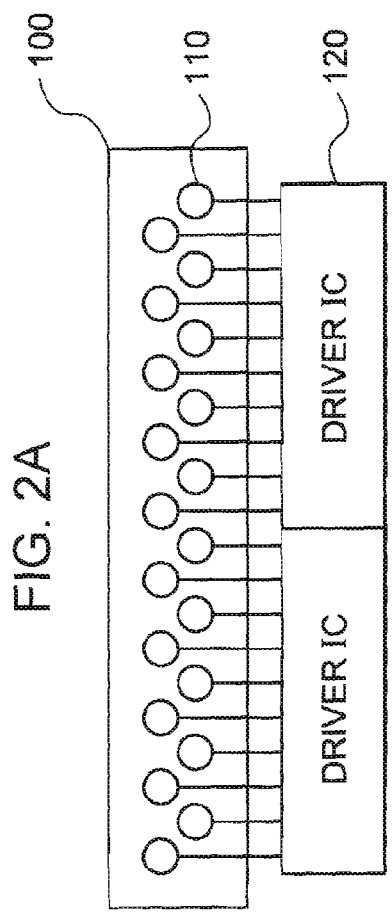
FIGS. 2A to 2C are constructional views showing methods of connecting an array of light-emitting devices and driver ICs.
Figure 2C:
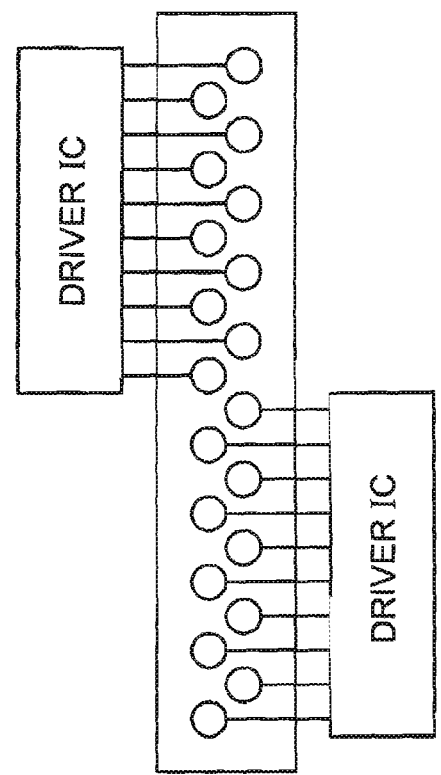
Figure 2B:
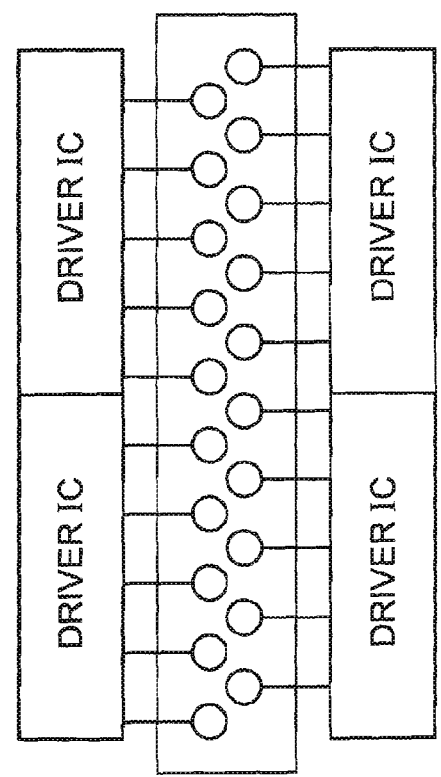

Next, methods of connecting an array of the light emitting devices 100 and the driver ICs 120 are described with reference to FIG. 2. FIGS. 2A to 2C are constructional views showing the methods of connecting an array of the light emitting devices 100 and the driver ICs 120. As shown in FIG. 2A, the light emitting devices 110 are alternately disposed on upper and lower portions of the device substrate 100 in a shape of zigzag. Examples of methods of connecting the light emitting devices 110 and the driver ICs 120 are shown in FIGS. 2A to 2C.

In FIG. 2A, only a lower stage of the driver ICs 120 is disposed under the device substrate 100 shown in FIG. 2A to be connected to the light emitting devices 110. In FIG. 2B, two upper and lower stages of the driver ICs 120 are disposed over and under the device substrate 100 shown in FIG. 2B. The upper stage of the light emitting devices 110 is connected to the upper-side driver ICs 120, and the lower stage of the light emitting devices 110 is connected to the lower-side driver IC 120. In FIG. 2C, a lower stage of the driver ICs 120 is disposed under a left half portion of the device substrate 100 shown in FIG. 2C, and an upper stage of the driver ICs 120 is disposed over a right half portion of the device substrate 100. The left half of the light emitting devices 110 are connected to the lower stage of the driver ICs 120, and the right half of the light emitting devices 110 are connected to the upper stage of the driver ICs 120.

As described above, there is a problem in that light-emitting brightness of the light emitting devices 110 among the devices is not uniform depending on the methods of connecting the light emitting devices 110 and the driver ICs 120.

Figure 3:
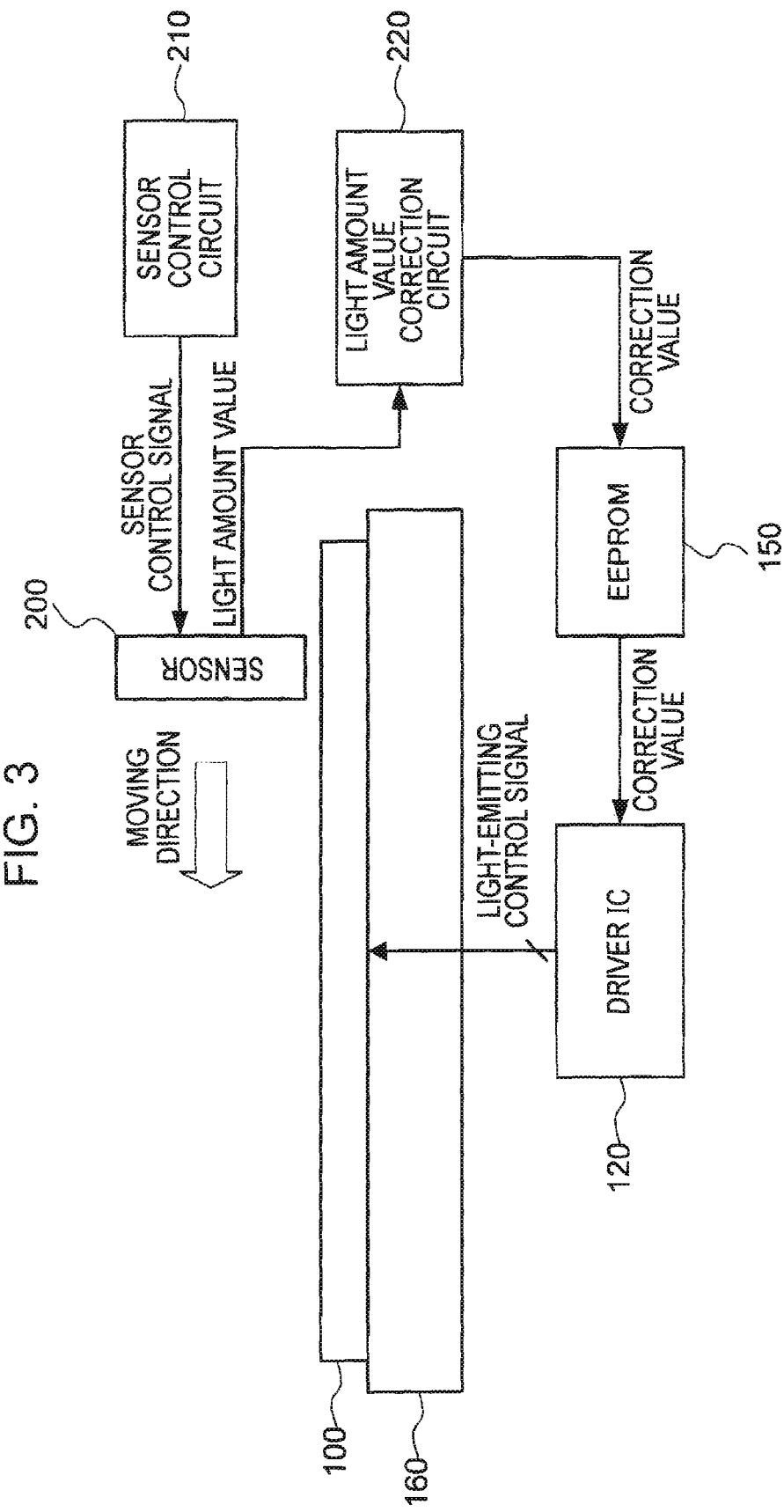
FIG. 3 is a schematic view showing a light amount value measuring apparatus for a light emitting apparatus.

Construction of Light Amount Value Measuring Apparatus For Light Emitting Apparatus Next, a light amount value measuring apparatus for the light emitting apparatus according to the embodiment is described with reference to FIG. 3. FIG. 3 is a schematic constructional view showing the light amount value measuring apparatus for the light emitting apparatus 1. As shown in FIG. 3, the light amount value measuring apparatus for the light emitting apparatus 1 includes a device substrate fixing plate 160 which fixes the device substrate 100, a sensor 200 which measures light amounts of the light emitting devices 110, a sensor control circuit 210 which controls the sensor 200, and a light amount value correction circuit 220 which process the light amount value measured by the sensor 200.

The sensor 200 is arranged to move on the device substrate 100 so as to measure the light amounts of all the light emitting devices 110 on the device substrate 100. The light emitting devices 110 emits light in response to light-emitting control signals of the driver ICs 120, and the sensor 200 transmits the light amount value for the light emitting devices 110 to the light amount value correction circuit 220 in response to the sensor control signal transmitted from the sensor control circuit 210. The light amount value correction circuit 220 calculates correction values for the light emitting devices 100 based on the light amount values transmitted from the sensor 200 and stores the correction values in EEPROM 150.

Next, the light amount value correction circuit 220 is described with reference to FIG. 4. FIG. 4 is a constructional view showing the light amount value correction circuit 220. As shown in FIG. 4, the sensor 200 includes a light amount value measurement unit 222 which performs a light amount value measuring process. The light amount value measurement unit 222 generates a light amount value list 223 in the light amount value correction circuit 220. The light amount value correction circuit 220 includes a high pass filter 224 which performs a high frequency component extracting process and a low pass filter 226 which performs a low frequency component extracting process and generates a high frequency light amount value list 225 and a low frequency light amount value list 227 from the light amount value list 223. In addition, the light amount value correction circuit 220 further includes a correction value calculation unit 228 which performs a correction value calculating process. The correction value calculation unit 228 calculates correction values for the light-emitting devices 110 based on the high frequency light amount value list 225 and the low frequency light amount value list 227 and stores the correction values in the EEPROM 150. In addition, each of the driver ICs 120 includes a grayscale value correction unit 230 which performs a grayscale value correcting process and corrects grayscale values of input data based on the correction values stored in the EEPROM 150.

Method of Dividing Light Amount Values into High and Low Frequency Components Now, a method of dividing the light amount value list into high and low frequency components is described with reference to FIG. 5. FIGS. 5A to 5C are graphs showing the method of dividing the light amount value list into the high and low frequency components. The graph "a" drawn with a solid line in FIG. 5A is a light amount value list for the light emitting devices 110 measured by the sensor 200. The graph "b" drawn with a dotted line which is constructed with lowest points of valleys of the waveform of the graph "a" is a graph representing a tendency of the light amount values in the whole light amount value list which is not dependent on a difference between the light amount values of the adjacent light emitting devices 110. The graph shown in FIG. 5B is a graph of high frequency components obtained by filtering the graph "b" with a high pass filter 224 using a predetermined cutoff frequency. The graph known in FIG. 5C is a graph of low frequency components obtained by filtering the graph "b" with a low pass filter 226 using a predetermined cutoff frequency.

Figure 6:
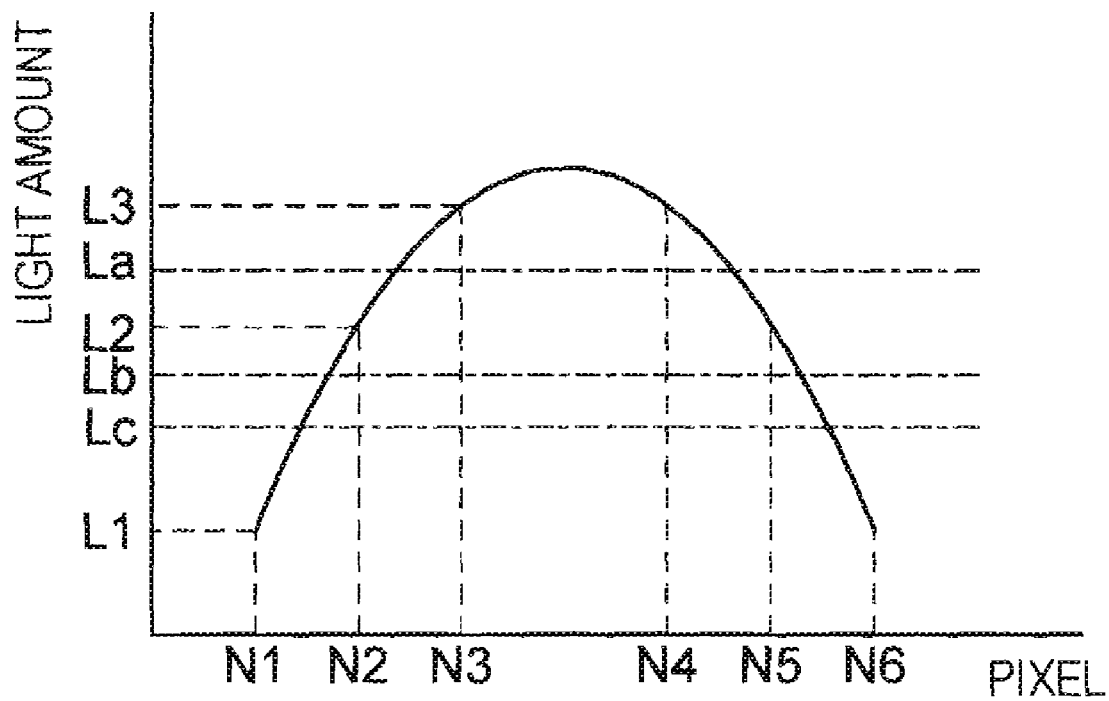
FIG. 6 is a graph showing a relation between light amount values and allowable ranges.

Next, a relation between the light amount values and the allowable ranges is described with reference to FIG. 6. FIG. 6 is a graph showing a relation between the light amount values and the allowable ranges.

As shown in FIG. 6, La denotes an upper limit of the allowable range of the light amounts as a specification of the printer line heads, Lc denotes a lower limit of the allowable range of the light amounts as a specification of the printer line heads, and Lb denotes is a lower limit obtained by adding a deterioration of the light amount values deteriorated according to an elapsing time of the light emitting devices 110 to the lower limit Lc. The light amount values of the light emitting devices 110 are corrected so as to be included in a range of from the lower limit Lb to the upper limit La. In FIG. 6, since a light amount value L1 of an N1-th pixel is lower than the lower limit Lb, the light amount value is corrected so as to satisfy Lb≦L1≦La. Since a light amount value L2 of an N2-th pixel satisfies Lb≦L2≦La, the light amount value is not corrected. Since a light amount value L3 of an N3-th pixel is higher than the upper limit La, the light amount value is corrected so as to satisfy Lb≦L3≦La.

Process of Correction Value Calculation Unit

Figure 7:
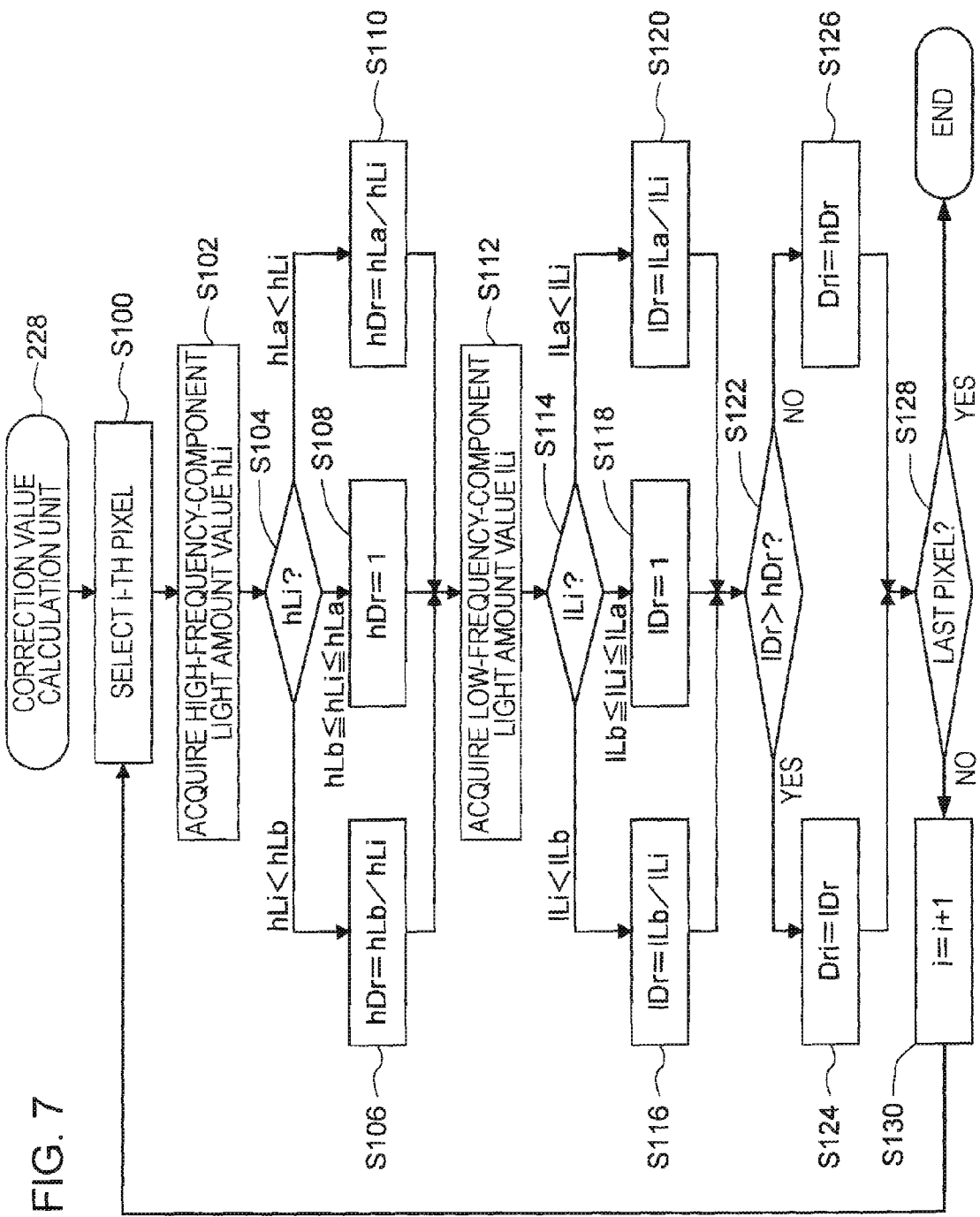
FIG. 7 is a flowchart for explaining a process of a correction value calculation unit.

Next, a process of the correction value calculation unit 228 is described with reference to FIG. 7. FIG. 7 is a flowchart for explaining a process of the correction value calculation unit 228. In FIG. 7, "i" is a natural number which satisfies 1≦i≦m when the number of light-emitting devices 110 arrayed on the device substrate 100 is m. In addition, hLa denotes an upper limit of high frequency components, and hLb denotes a lower limit of low frequency components. A range of from 1Lb to 1La is a first allowable range, and hDr denotes a first correction value. In addition, 1La denotes an upper limit of low frequency components, and 1Lb denotes a lower limit of low frequency components. A range of from 1Lb to 1La is a second allowable range, and 1Dr denotes a second correction value. In the embodiment, a larger value among the IDr and the hDr is set to be the correction value.

Firstly, in Step S100, an i-th (first; i=1) light emitting device 110 is selected, and in Step S102, an i-th light amount value hLi is acquired from the high frequency light amount value list 225.

Next, in Step S104, it is determined whether or not the light amount value hLi is included in the range of from hLb to hLa. When hLi<hLb, the process proceeds to Step S106. When hLb≦hLi≦hLa, the process proceeds to Step S108. When hLa<hLi, the process proceeds to Step S110.

Next, in Step S106, hDr=hLb/hLi is set. In Step S108, hDr=1 is set. In Step S110, hDr=hLa/hLi is set. Next, the process proceeds to Step S112.

In Step S112, an i-th light amount value ILi is acquired from the low frequency light amount value list 227.

Next, in Step S114, it is determined whether or not the light amount value 1Li is included in the range of from 1Lb to 1La. When 1Li<1Lb, the process proceeds to Step S116. When 1Lb≦1Li≦1La, the process proceeds to Step S118. When 1La<1Li, the process proceeds to Step S120.

Next, in Step S116, 1Dr=1Lb/1Li is set. In Step S118, 1Dr=1 is set. In Step S120, 1Dr=1La/1Li is set. Next, the process proceeds to Step S122.

Next, in Step S122, it is determined whether or not 1Dr is larger than hDr. When 1Dr>hDr, the process proceeds to Step S124, and IDr is set to be the correction value Dri of the i-th light emitting device 110. When 1Dr≦hDr, the process proceeds to Step S126, and hDr is set to the correction value Dri of the i-th light emitting device 110. Next, the process proceeds to Step S128.

Next, in Step S128, it is determined whether or not the selected light emitting device 110 is the last one (i=m) When it is the last one, the process ends. When it is not the last one, the process proceeds to Step S130.

Next, in Step S130, the correction value Dri is stored in EEPROM 150, and i=i+1 is set. Next, the process returns to Step S100.

Correction of High Frequency Component

Next, correction of the high frequency components of the light amount values is described with reference to FIG. 8. FIGS. 8A and 8B are graphs for explaining the correction of the high frequency component of the light amount values. As shown in FIGS. 8A and 8B, hLa denotes an upper limit of the high frequency components as a specification of the printer line heads, hLc denotes a lower limit of the high frequency components as a specification of the printer line heads, and hLb denotes is a lower limit obtained by adding a deterioration of the light amount values deteriorated according to an elapsing time of the light emitting devices 110 to the lower limit hLc.

Since the light amount values of all the high frequency components is included in an allowable range of from hLb to hLa as shown in (A1) of FIG. 8A, the correction value becomes 1, so that the correction is not performed as shown in (A2) of FIG. 8A.

On the other hand, for a light emitting device 110 of which light amount value is lower than the lower limit hLb as shown in the upper graph of FIG. 8B, the correction value is set so as to be included in the allowable range of from hLb to hLa as shown in the lower graph of FIG. 8B.

Correction of Low Frequency Component

Next, correction of the low frequency components of the light amount values is described with reference to FIG. 9. FIGS. 9A and 9B are graphs for explaining the correction of the low frequency component of the light amount values. As shown in FIGS. 9A and 9B, hLa denotes an upper limit of the low frequency components as a specification of the printer line heads, 1Lc denotes a lower limit of the low frequency components as a specification of the printer line heads, and 1Lb denotes is a lower limit obtained by adding a deterioration of the light amount values deteriorated according to an elapsing time of the light emitting devices 110 to the lower limit 1Lc. In addition, an allowable range of from 1Lb to 1La is set to be wider than the allowable range of from hLb to hLa.

Figure 9B:
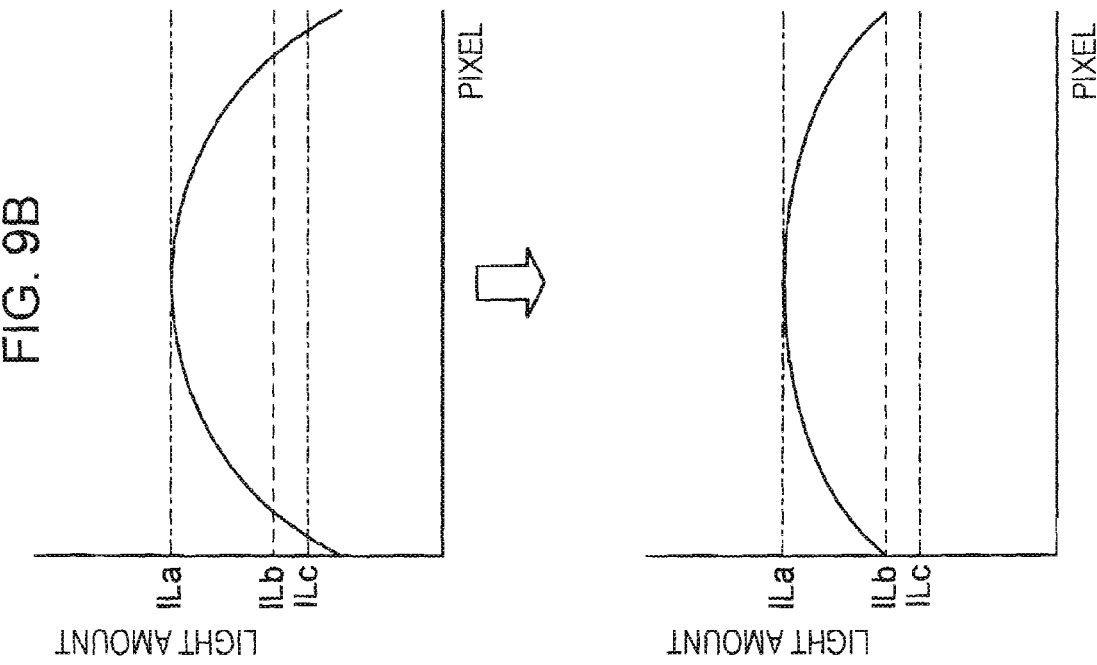
FIGS. 9A and 9B are graphs for explaining correction of a low frequency component of a light amount value.
Figure 9A:
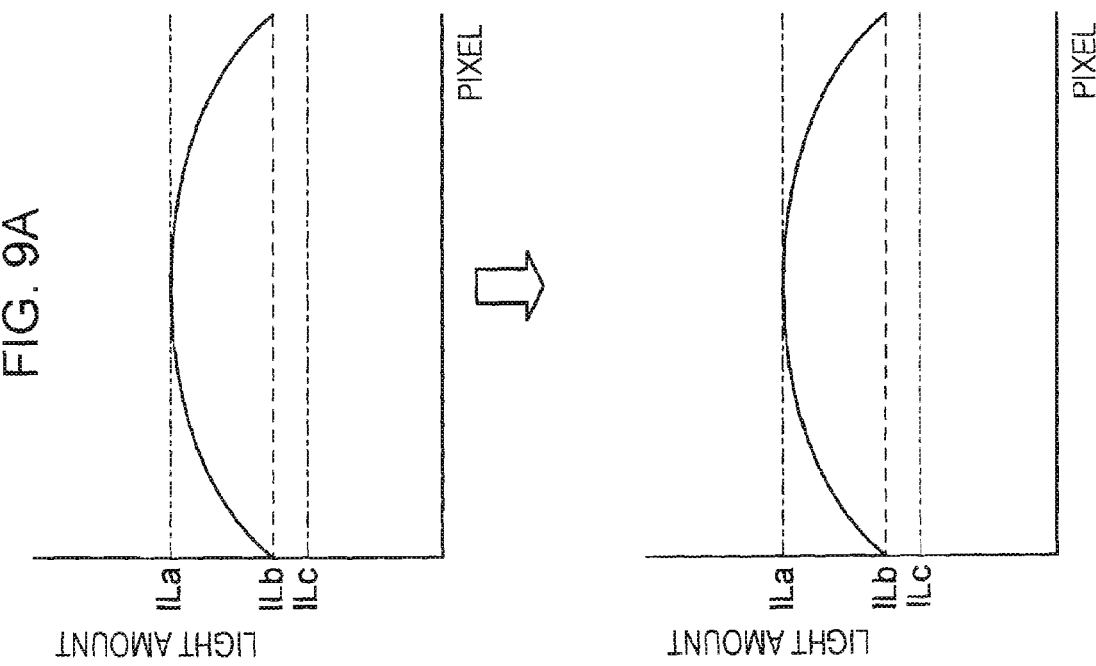

Since the light amount values of all the low frequency components is included in an allowable range of from 1Lb to 1La as shown in the upper graph of FIG. 9A, the correction value becomes 1, so that the correction is not performed as shown in the lower graph of FIG. 9A.

On the other hand, for a light emitting device 110 of which light amount value is lower than the lower limit 1Lb as shown in the upper graph of FIG. 9B, the correction value is set so as to be included in the allowable range of from 1Lb to 1La as shown in the lower graph of FIG. 9B.

According to the aforementioned embodiment, the following advantages can be obtained.

According to the embodiment, at the time of shipment of the light emitting apparatus 1, the light amounts of the all the light emitting devices 110 are measured, and the measured light amount value list is divided into the high and low frequency components. The correction value is calculated from a variation of the light amount values between the adjacent light emitting devices 110 and a variation of the light amount values of the entire light emitting devices 110 so as for the light amounts to be uniform. Therefore, the correction can be performed by taking into consideration characteristics of the light emitting devices. As a result, a deterioration of the light emitting devices can be suppressed, so that it is possible to maintain printing quality.

Hereinbefore, although the preferred embodiment is described, the invention is not limited to the embodiment, but various modifications can be made without departing from a spirit and scope of the invention. Hereinafter, modified examples of the invention are described.

FIRST MODIFIED EXAMPLE

A light emitting apparatus 1 according to a first modified example of the invention is described. In the first embodiment, the light emitting apparatus is used as an independent apparatus to calculate the correction value as described in FIG. 3. However, in a state that the correction is performed based on the calculated correction value, the light emitting apparatus 1 may be assembled into a printer, and a printing result printed on a paper with the same color (for example, black) is measured by using a densitometer, so that the correction value may be readjusted so as to remove color irregularity.

SECOND MODIFIED EXAMPLE

A light emitting apparatus according to a second modified example of the invention is described. The correction value calculation unit 228 may set the correction values so as for the light amount values of the light emitting devices disposed at both ends of the device substrate 100 to be equal to each other. According to the second modified example, when a uniform color is printed on the paper by using the light emitting apparatus 1, colors at the both side of the paper become equal to each other, so that there is no discomfort between the transversely aligned colors.

THIRD MODIFIED EXAMPLE

A light emitting apparatus 1 according to a third modified example of the invention is described. The light emitting apparatus 1 is not limited to the aforementioned printer line heads, but it may be employed in a display apparatus. In the display apparatus, a plurality of the light emitting devices may be two-dimensionally arrayed to be used as pixel for displaying an image. In addition, the light emitting device may be employed in various electronic apparatus which the display apparatus is built in.

Image Forming Apparatus

Now, an example of an image forming apparatus using the light-emitting apparatus 1 shown in FIG. 1 as an exposure unit is described with reference to FIG. 10.

Figure 10:
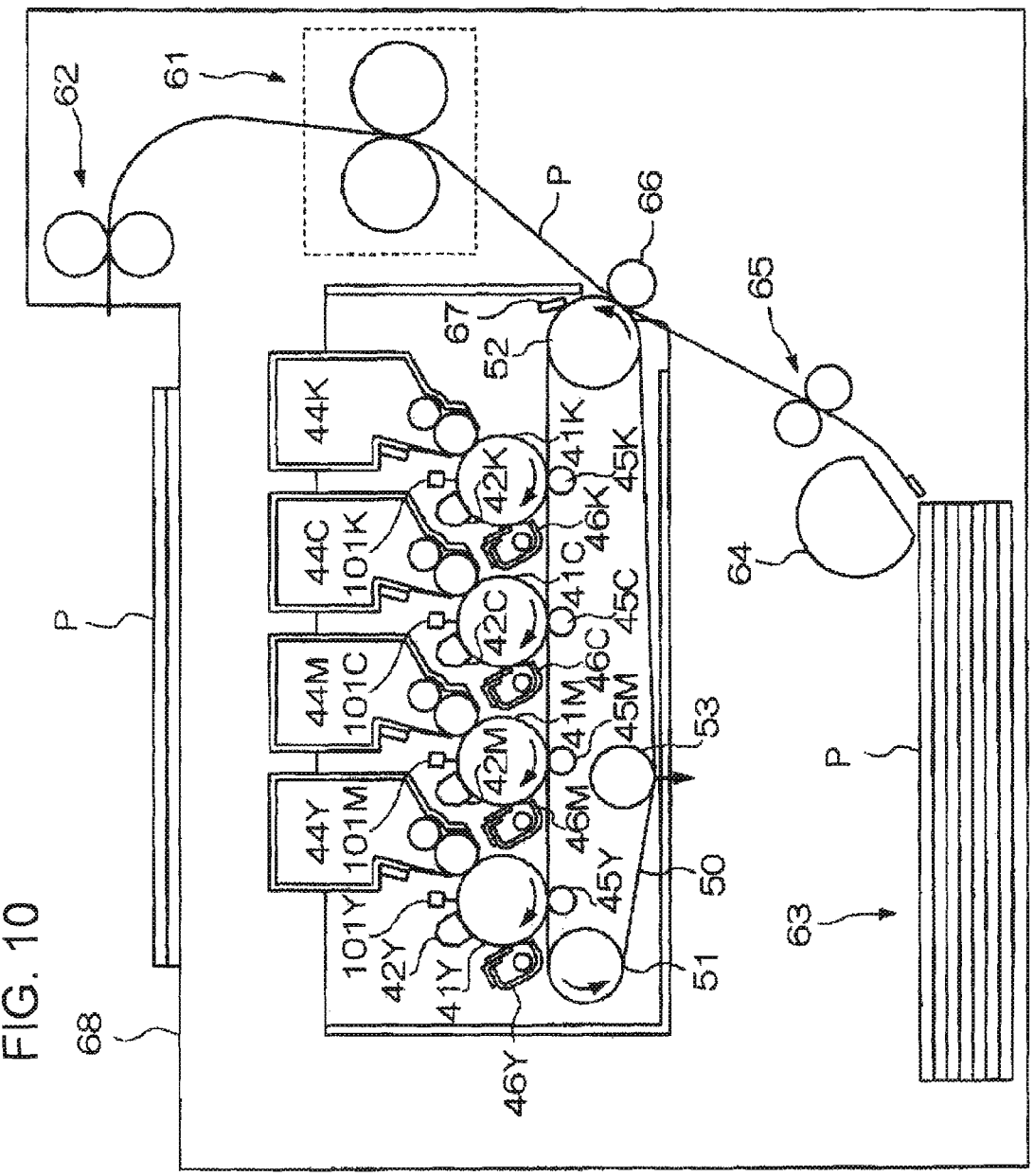
FIG. 10 is a cross sectional view showing an example of a construction of an image forming apparatus using a light emitting apparatus.

FIG. 10 is a transverse side cross sectional view showing a construction of an image forming apparatus. The image forming apparatus is a tandem type image forming apparatus constructed with four organic EL array line heads 101K, 101C, 101M, and 101Y having the same construction as that of the light emitting apparatus shown in FIG. 1 which are used as exposure units for exposing four corresponding photosensitive drums (image containers) 41K, 41C, 41M and 41Y. Here, K, C, M, and Y attached to the reference numerals are initials of black, cyan, magenta, and yellow and indicate black, cyan, magenta, and yellow photosensitive bodies. The same notation is also used for other elements.

The image forming apparatus includes a driving roller 51, a driven roller 52, and a tension roller 53. In addition, the image forming apparatus also includes an intermediate transfer belt 50 which is arranged to extend by tension of the tension roller 53 and is driven to circulate in an arrow direction (counterclockwise) shown in the figure. On the intermediate transfer belt 50, the photosensitive drums 41K, 41C, 41M, and 41Y having photosensitive layers on outer circumferential surfaces thereof are disposed as four image containers with a predetermined interval.

The photosensitive drums 41K, 41C, 41M, and 41Y are driven to rotate in an arrow direction (clockwise) in synchronization with the driving of the intermediate transfer belt 50. In the vicinity of the photosensitive drums 41K, 41C, 41M, and 41Y, there are disposed charging units (corona chargers) 42K, 42C, 42M, and 42Y which uniformly charge the outer circumferential surfaces of the photosensitive drums 41K, 41C, 41M, and 41 and organic EL array line head 101K, 101C, 101M, and 101Y which sequentially line-scan the outer circumferential surfaces uniformed charged by the charging units 42K, 42C, 42M, and 42Y in synchronization with the rotation of the photosensitive drums 41K, 41C, 41M, and 41Y.

In addition, the image forming apparatus includes developing units 44 K, 44C, 44M, and 44Y which develop visible images (toner images) by applying toners (developing materials) on electro-static latent images formed by the organic EL array line heads 101K, 101C, 101M, and 101Y, primary transfer rollers 45K, 45C, 45M, and 45Y which sequentially transfer the toner images developed by the developing units 44 K, 44C, 44M, and 44Y on the intermediate transfer belt 50), that is, primary transfer objects, and cleaning units 46 K, 46C, 46M, and 46Y which remove toners remaining on the surfaces of the transferred photosensitive drums 41K, 41C, 41M, and 41Y.

Here, the organic EL array line heads 101K, 101C, 101M, and 101Y are disposed so as for the array direction to be aligned with a main line of the photosensitive drums 41K, 41C, 41M, and 41Y. Light-emitting energy peak wavelength of the organic EL array line heads 101K, 101C, 101M, and 101Y and sensitivity peak wavelengths of the photosensitive drums 41K, 41C, 41M, and 41Y are set to be substantially equal to each other.

The developing units 44 K, 44C, 44M, and 44Y use, for example, a single component non-magnetic toner as a developing material. The single component developing material is conveyed to a developing roller by, for example, a supplying roller. A thickness of a layer of the developing material attached on the surface of the developing roller is regulated by a regulating blade. Next, the developing roller is in contact with or pressed on the photosensitive drums 41K, 41C, 41M, and 41Y to attach the developing material on the photosensitive drums 41K, 41C, 41M, 41Y according to electric potential levels thereof, thereby developing the toner images.

The toner images of black, cyan, magenta, and yellow formed by four monotonic toner image formation stations are primarily transferred onto the intermediate transfer belt 50 by a primary transfer bias applied to the primary transfer rollers 45K, 45C, 45M, and 45Y and sequentially overlapped on the intermediate transfer belt 50 to form a full color toner image. The full color toner image is secondarily transferred onto a recording medium P such as a paper sheet by a secondary transfer roller 66 and, after that, passes through a fixing roller pair 61, that is, a fixing unit to be fixed on the recording medium P. The fixed toner image is discharged on a discharging tray 68 disposed at an upper portion of the image forming apparatus by a discharging roller 62.

In addition, in FIG. 10, reference numeral 63 denotes a feed cassette where a plurality of recording medium (P) sheets are stacked and held. Reference numerals 64 denotes a pickup roller which picks up and feeds the recording medium P sheet by sheet from the feed cassette 63. Reference numerals 65 denotes a gate roller pair which controls timings of supplying the recording medium P to the secondary transfer unit of the secondary transfer roller 66. Reference numerals 66 denotes the secondary transfer roller, that is, a secondary transfer unit for the intermediate transfer belt 50. Reference numeral 67 denotes a cleaning blade which removes toners remaining on the surface of the secondarily-transferred intermediate transfer belt 50.

The entire disclosure of Japanese Patent Application No. 2005-229141, filed Aug. 8, 2005 is expressly incorporated by reference herein.

What is claimed is:

1. A light amount correcting method for a light emitting apparatus having a plurality of light emitting devices including a first light emitting device and a second light emitting device, and some of the plurality of light emitting devices being arranged between the first light emitting device and the second light emitting device, the method comprising the steps of:
   measuring light amount values of a plurality of the light emitting devices;
   extracting high frequency components from the measured light amount values;
   extracting low frequency components from the measured light amount values;
   calculating a first correction value for correcting a light amount value of the first light emitting device on the basis of the high frequency components;
   calculating a second correction value for correcting the light amount value of the first light emitting device on the basis of the low frequency components values,
   wherein the light amount value of the first light emitting device is corrected based on the first correction value and the second correction value such that the light amount value of the first light emitting device is included in both of a first allowable range and a second allowable range, and
   wherein the first allowable range is between an upper limit of the high frequency components and a lower limit of the high frequency components, and the second range is between an upper limit of the low frequency components and a lower limit of the low frequency components; and
   correcting a light amount value of the second light emitting device such that it is included in both of the first allowable range and the second allowable range,
   wherein at least one of the lower limits of the first and second allowable ranges is set to a value that includes a value corresponding to a deterioration of the light amount values according to an elapsing time of the light emitting devices.

2. The light amount correcting method according to claim 1, wherein the second allowable range is wider than the first allowable range.

3. The light amount correcting method according to claim 1, wherein when at least one of the light amount values of the first light emitting device and the second light emitting device is included in the first allowable range and in the second allowable range, the light amount value of the one of the first light emitting device and the second light emitting device is not corrected.

4. The light amount correcting method according to claim 1, wherein the correcting of values of the first light emitting device and the second light emitting device is based on a voltage.

5. The light amount correcting method according to claim 1, wherein the correcting of the light amount values of the first light emitting device and the second light emitting device is based on a current.

6. The light amount correcting method according to claim 1, wherein the correcting of the light amount values of the first light emitting device and the second light emitting device is based on a light-emitting time.

7. The light amount correcting method according to claim 1, wherein the first light emitting device and the second light emitting device are driven according to grayscale values of input data, and at least one of first and second a second correction values is calculated with respect to the corresponding grayscale values.

8. A light emitting apparatus, wherein the light amount values of a plurality of the light emitting devices are corrected by using the light amount correcting method according to claim 1.

9. The light emitting apparatus according to claim 8, wherein a plurality of the light emitting devices are organic light emitting diode devices.

10. The light emitting apparatus according to claim 8, wherein a plurality of the light emitting devices are arrayed in a shape of one line.

11. An image forming apparatus comprising:
   a photosensitive body;
   a charging unit which uniformly charges the photosensitive body;
   an exposure unit which includes the light emitting apparatus according to claim 10 and exposes the photosensitive body to form an electro-static latent image corresponding to a to-be-formed image on the photosensitive body;
   a developing unit which develops the electro-static latent image on the photosensitive body as a toner image;
   a transferring unit which transfers the toner image on the photosensitive body onto a transfer material; and
   a fixing unit which fixes the toner image on the transfer material.

12. The light emitting apparatus according to claim 8, wherein a plurality of the light emitting devices are two-dimensionally arrayed.

13. A display apparatus including the light emitting apparatus according to claim 12 and displaying an image by using the light emitting devices of the light emitting apparatus as pixels.

14. The light amount correcting method according to claim 1, the first light emitting device being arranged at one end of the array of the plurality of the light emitting devices, and the second light emitting device being arranged at the other end of the array.

15. The light amount correcting method according to claim 1, the method further comprising a steps of:
   correcting a light amount values of the some of the light emitting devices such that they are included in both of a first allowable range and a second allowable range.

16. The light amount correcting method according to claim 1, further comprising the steps of:
   generating a light amount value list based on the measured light amount values;
   generating a high frequency light amount value list by filtering the light amount value list with a high pass filter; and
   generating a light amount value list by filtering the light amount value list with a low pass filter.

17. An apparatus to be used for correcting light amount values of a light emitting apparatus including a plurality of light emitting devices, the light emitting devices including a first light emitting device and a second light emitting device, and some of the plurality of light emitting devices being arranged between the first light emitting device and the second light emitting device, the apparatus comprising:
   means for measuring light amount values of a plurality of the light emitting devices;
   means for extracting high frequency components from the light amount values;
   means for extracting low frequency components from the light amount value;
   means for calculating first correction value for correcting and means for second correction value for correcting the light amount value of the first light emitting device on the basis of the low frequency components values, wherein the light amount value of the first light emitting device is corrected based on the first correction value and the second correction value such that it is included in both of a first allowable range and a second allowable range, and wherein the first allowable range is between an upper limit of the high frequency components and a lower limit of the high frequency components, and the second range is between an upper limit of the low frequency components and the lower limit of the low frequency components; and means for correcting a light amount value of the second light emitting device such that it is included in both of a first allowable range and a second allowable range, wherein at least one of the lower limits of the first and second allowable ranges is set to a value that includes a value corresponding to a deterioration of the light amount values according to an elapsing time of the light emitting devices.

* * * * *